United States Patent [19]

West

[11] 4,219,263
[45] Aug. 26, 1980

[54] CAMERA FOR USE IN A TELESCOPE

[76] Inventor: Robert D. West, 1031 Hanshaw Rd., Ithaca, N.Y. 14850

[21] Appl. No.: 44,259

[22] Filed: May 31, 1979

[51] Int. Cl.$^2$ ............... G02B 23/00; G03B 17/48
[52] U.S. Cl. ........................... 354/79; 350/19
[58] Field of Search .................. 354/77–79, 354/161, 276; 350/19

[56] References Cited

U.S. PATENT DOCUMENTS

| | | | |
|---|---|---|---|
| 1,625,952 | 4/1927 | Lucas | 354/79 |
| 2,937,584 | 5/1960 | Gesualdi | 354/79 |
| 3,545,355 | 12/1970 | Cahall | 354/79 |

Primary Examiner—John Gonzales
Attorney, Agent, or Firm—Bruns & Jenney

[57] ABSTRACT

A simple and inexpensive camera for use in conjunction with a telescope that includes a hollow mounting cylinder that is able to be conveniently slipped into the focus mount of the telescope to align the camera along the optical axis of the instrument and to properly locate the camera thereupon. In assembly, the cylinder depends downwardly from the bottom of the camera housing and conducts the telescopic image into an exposure aperture passing vertically through the housing. A film slit passes horizontally through both the housing and the aperture to provide a guideway for positioning film over the aperture within the image plane of the telescope. A slide containing a ground optical element is slidably supported in the aperture whereby the element is movable into a first position within the image plane of the telescope to present a light image of an observed body thereupon, and into a second position wherein the bottom surface of the element is coextensively aligned with the top wall of the film slit.

12 Claims, 5 Drawing Figures

CAMERA FOR USE IN A TELESCOPE

BACKGROUND OF THE INVENTION

This invention relates to a simple camera that can be quickly and accurately mounted upon a telescope to provide a clear shape picture of an observed celestial body.

Typically, quality cameras that are presently available for use in conjunction with telescopes are expensive and rather complex devices that are oftentimes difficult to mount and require special mounting brackets in order to be properly aligned upon the instrument. The brackets, which are also expensive, usually require some reworking of the instrument so that the bracket can be permanently secured thereto. Cruder, less expensive, cameras that might be available are equally difficult to mount and do not provide the same performance as the higher quality device. Accordingly, the average amateur astronomer who might wish to record his observations finds he cannot afford to do so.

SUMMARY OF THE INVENTION

It is therefore an object of the present invention to reduce the expense of cameras used in conjunction with telescopes.

A further object of the present invention is to facilitate easy mounting and aligning of a camera upon a telescope.

Yet another object of the present invention is to provide a camera for use in conjunction with a telescope that requires no special mounting brackets.

A still further object of the present invention is to provide a simple, inexpensive camera that is capable of providing good photographs of a celestial body viewed through a telescope.

These and other objects of the present invention are attained by means of a simple camera that is capable of being slidably mounted in the focus mount tube of a telescope. The camera includes a hollow mounting cylinder that is slidably received within the focus mount tube and a film support housing secured to the cylinder. An exposure aperture is provided in the housing over the mounting cylinder so that the telescopic image may be brought into focus within the aperture. A film slit is passed horizontally through both the housing and the aperture to form a guideway for positioning the film in the image plane of the system. A slide mechanism is movably mounted in the aperture which contains a flat ground optical element that is capable of being located in the image plane when the slide mechanism is placed in a first position and which forms a part of the top wall of the film slit when the slide mechanism is placed in a second position.

BRIEF DESCRIPTION OF THE DRAWINGS

For a better understanding of these and other objects of the present invention reference is had to the following detailed description of the invention that is to be read in conjunction with the accompanying drawings wherein.

DESCRIPTION OF THE INVENTION

Figure 1:
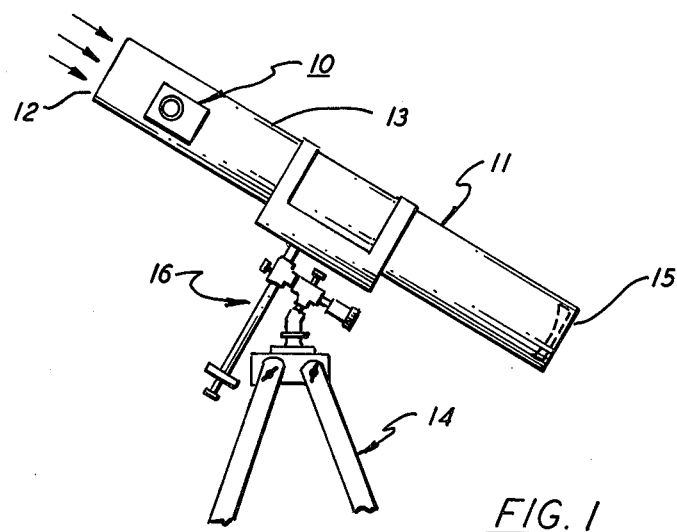
FIG. 1 is a side elevation of a telescope containing a camera embodying the teachings of the present invention.
Figure 2:
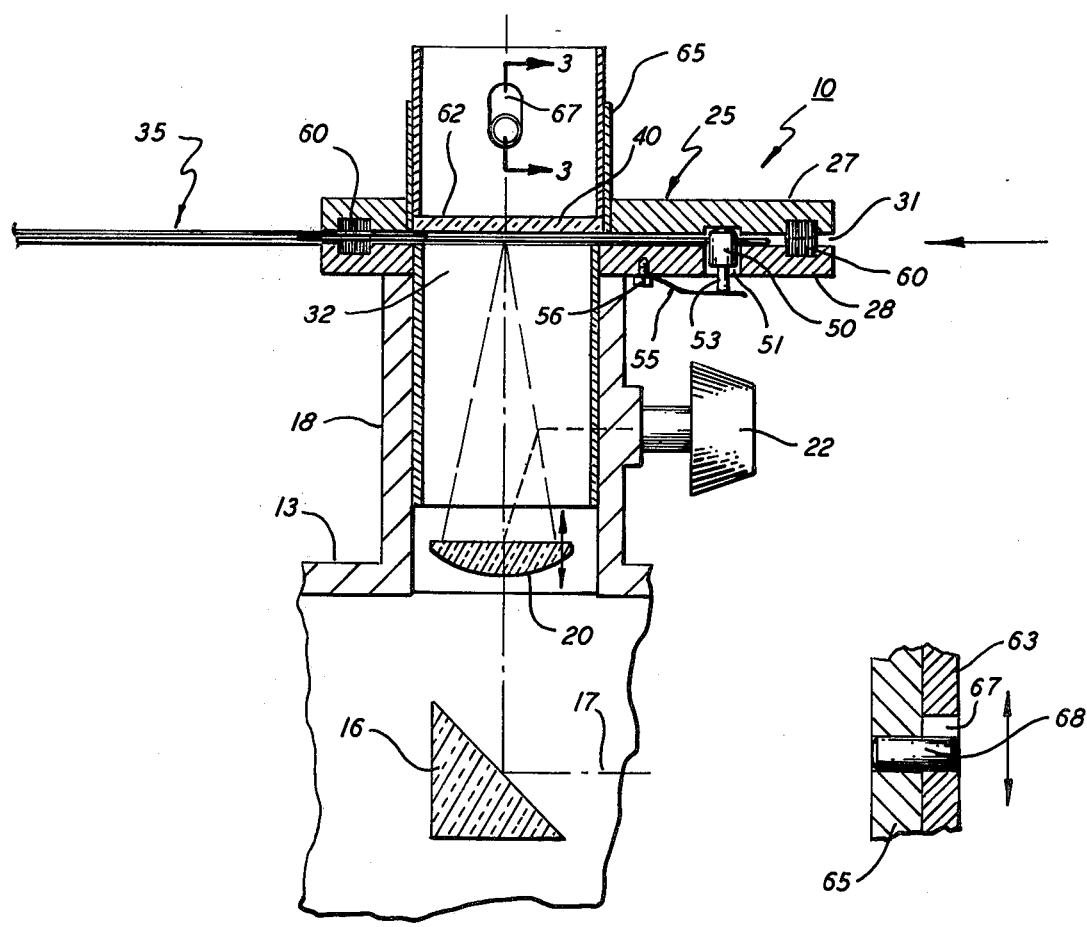
FIG. 2 is an enlarged side elevation of the camera shown in FIG. 1 illustrating the camera slidably mounted within the focus mount tube of the telescope.

Referring initially to FIGS. 1 and 2, there is illustrated a camera generally referenced 10, that is slidably mounted within the focus mount tube of telescope 11. Although the camera embodying the teachings of the present invention can be used in many different types of telescopes, it will be herein described in association with a Newtonian-type telescope. The Newtonian telescope relies upon a reflecting principal to produce an image of an observed celestial body. Light from the observed object is permitted to enter the open end 12 of the telescope barrel 13, pass down the barrel and strike a light-gathering mirror 15 positioned at the opposite end thereof. The reflected light from the light-gathering mirror is redirected up the barrel onto a prism 16 (FIG. 2) located along the optical axis 17 of the system. The prism functions to turn the optical axis 90° from the axis of the telescope and directs the image through the focus mount tube 18 of the instrument. The prime focus plane, or more simply, the image plane of the telescope, lies just beyond the outer rim of the focus mount tube. An adjustable eyepiece 20 is placed in the optical path of the instrument and is used to bring the telescopic image into sharp focus at the image plane of the system. Eyepiece adjustment is accomplished through means of a knob 22 acting through any suitable type linkage (not shown) as known and used in the art.

The barrel of the telescope is secured to a tripod 14, or any other suitable base, by means of an equitorial type mount 16. This type of mount affords the barrel two degrees of freedom that enables the telescope to be set up to track stars, galaxies and nebulae across the sky. Although not shown, a suitable drive means can also be operatively connected to the mount to automatically turn the telescope at a desired rate so as to hold the celestial body motionless in the object plane of the instrument. Accordingly, by mounting a camera over the focus mount tube, a time exposure of the observed body can be made to provide a clear sharp picture.

Figure 3:
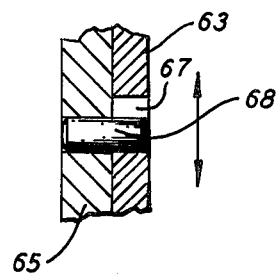
FIG. 3 is a partial enlarged section taken along lines 3—3 in FIG. 2 showing a stop mechanism for selectively positioning an optical element utilized in the camera for viewing the telescopic image focused in the exposure aperture of the camera.
Figure 4:
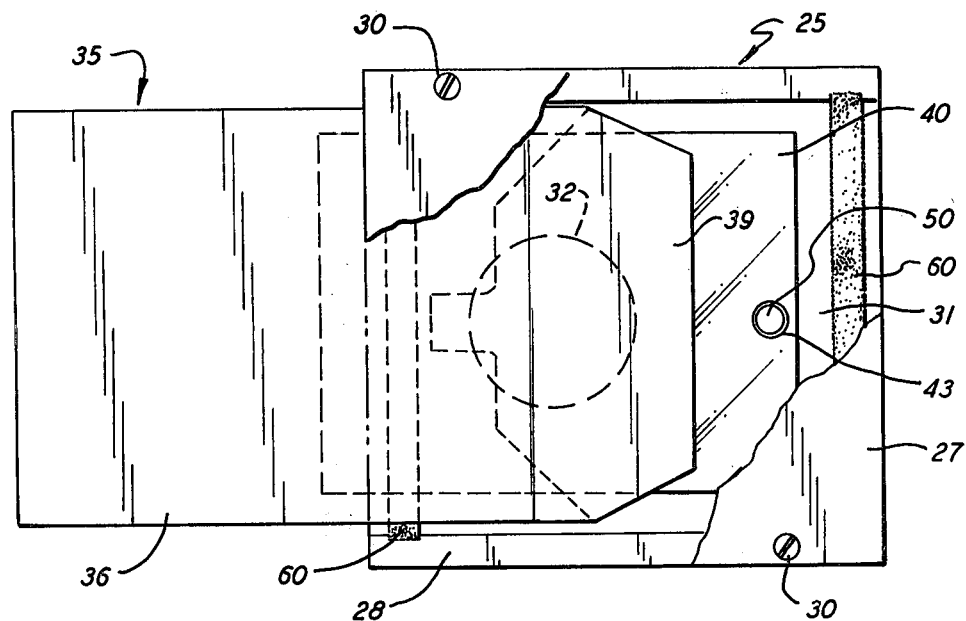
FIG. 4 is a top plan view of the camera shown in FIG. 2 with portions broken away to illustrate a film positioned over the exposure aperture of the camera.

As best seen in FIGS. 2–4, the present camera includes a rectangular-shaped flat housing 25 and a hollow mounting cylinder 26 that is capable of being slidably received within the focus mount tube 18 of the telescope. The housing is formed of an upper plate 27 and a lower plate 28 that are joined together in assembly via screws 30. The abutting surfaces of the two plates each contain a shallow cutout which coact in assembly to provide a horizontal slit 31 that passes through the housing. A vertical exposure aperture 32 is also formed in the housing which passes through the slit 31 as best seen in FIG. 4.

The mounting cylinder is press fitted into the lower entrance to the aperture contained in lower plate 28 so as to securely support the housing thereupon. In practice, the outer diameter of the cylinder is dimensioned to provide a close running fit with the inside diameter of the focus mount tube. To mount the camera, the cylinder is slipped into the tube and the bottom surface of the housing is seated upon the upper rim of the focus mount tube. This, in turn, causes the film slit 31 to be positioned within the image plane of the telescope. Accordingly, film passed into the camera through the slit can be quickly and conveniently aligned within the prime focus plane of the telescope instrument.

Figure 5:
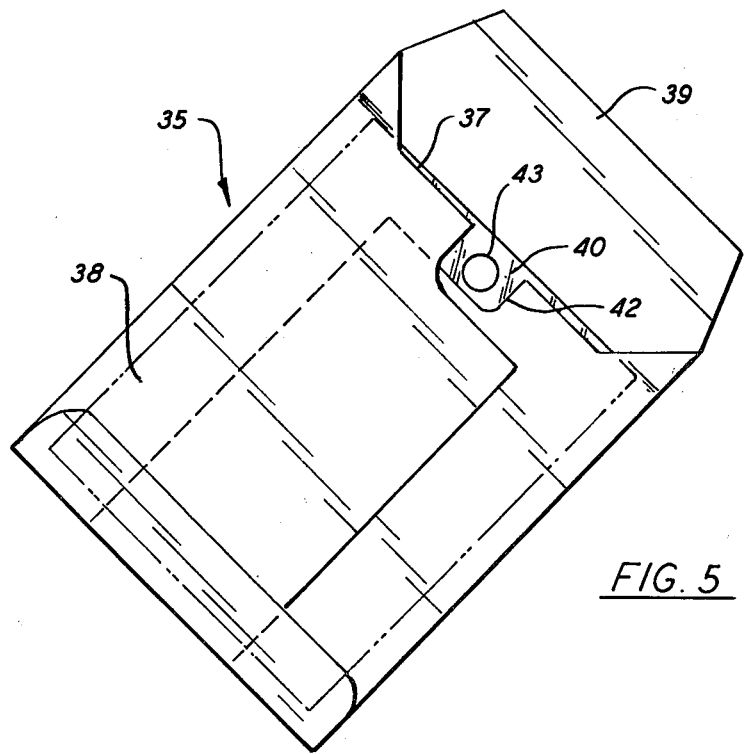
FIG. 5 is a bottom view that is slightly enlarged showing a film packet suitable for use in the present camera.

Film for the present camera is contained in a film packet 35 as illustrated in FIG. 5. The packet is made of any suitable light-tight material, such as heavy cardboard, which is cut and folded to form a rectangular-shaped envelope that is capable of being passed through the camera slit. The top panel 36 of the envelope extends outwardly beyond the top margin 37 of bottom panel 38 to form a closure flap 39. Normally, when the film is held in storage, the flap will be closed to totally shield the film 40 within the envelope. When the flap is opened as shown in FIG. 5, a cutout 42 formed in the top margin of the bottom panel is exposed to provide access to a hole 43 contained in the film. As will be explained in greater detail below, the packet is passed into the slit with its flap in an open position so that a locating pin can engage the hole in the film and thereby position the film over the exposure aperture.

A locating pin 50 is mounted in a vertical hole 51 formed in the housing. The pin is adapted to pass upwardly into the film receiving slit 31. A thin shank 53 depends from the base of the pin and extends downwardly through an opening provided in the bottom wall of the housing. A biasing spring 55, secured at one end in the housing by screw 56, acts upon the bottom of the shank to urge the pin upwardly into the slit 31. To load film into the camera, the flap of the film packet is first opened to uncover the hole in the film and the closed end of the envelope is passed into the right hand entrance to the slit as seen in FIG. 2 with the bottom panel of the envelope facing down. A deep chamber is formed at the top of the locating pin which allows the envelope to be easily pushed over the pin and thus force the pin down against the biasing pressure of the spring.

The locating pin is accurately positioned in relation to the slit so that it will move upwardly into the hole in the film to secure the film in a given position when the hole is brought into registration with the pin. When so registered, both the envelope and the film will extend slightly beyond the exit region of the slit in the left hand side wall of the housing as shown in FIGS. 2 and 4. By grasping the protruding edge of the envelope, the envelope can be slipped over the arrested film a sufficient distance to uncover the film position over the exposure aperture to permit the telescopic image to be recorded thereon. After a desired exposure period, the envelope is pushed back over the film to enclose the film therein and the locating pin released from the film hole by relieving the biasing pressure of the spring. Lastly, the envelope with the film therein is slidably removed from the housing through the exit opening.

As can be seen, the envelope, when used as described above, acts as a simple shutter in the system to control the exposure period. A pair of penetratable light-tight seals 60—60 are located at both the slit entrance and the exit to the housing to prevent unwanted ambient light from entering the exposure region while at the same time, permitting the film packet to freely pass therethrough.

An optical element 62 of ground glass is mounted within the bottom of a slide 63 mounted in the top part of the aperture within a tubular guide 65. As best seen in FIG. 3, the slide contains a vertically aligned slotted hole that houses a stop pin 68 secured in the side wall of the guide. In practice, the pin limits the amount of travel afforded the slide within the aperture so that the optical element is movable between the two extreme stop positions. In the first or lower stop position, the flat optical element is placed within the image plane of the telescope whereby a visual image of an observed body is present. The image presented upon the glass can be focused using the eyepiece as noted above prior to photographing the object. Once focused, the optical element is raised into the second stop position which positions the bottom surface thereof in coalignment with the top wall of the slit. This, in turn, provides an unbroken wall extending across the exposure aperture along which the film and the film packet can be guided thus preventing them from being hung up during positioning.

While this invention has been described with reference to the details as set forth above, it is not limited to the specific structure as disclosed and the invention is intended to cover any modifications or changes as may come within the scope of the following claims.

I claim:
1. A camera that is capable of being mounted within the focus mount tube of a telescope through which the telescopic image passes including
   a housing having an exposure aperture passing vertically therethrough,
   a hollow mounting cylinder depending downwardly from the bottom wall of the housing, said cylinder being coaxially aligned with the aperature and arranged to enclose the bottom entrance to the aperture therein, said cylinder being slidably received within the focus mount tube to permit the telescopic image to be presented upon an image plane lying within said housing,
   said housing containing a horizontal slit passing through both the housing and the aperture, said slit being aligned within the image plane of the telescope and arranged to guide film over said aperture,
   locating means for engaging film passed into said slit and positioning the film over the aperture whereby the film is exposed to the telescopic image.

2. The camera of claim 1 that further includes a slide means mounted within the aperture that is arranged to move in a vertical direction therein, a flat ground optical element supported in said slide means so that the element can be positioned in the image plane of the telescope whereby the telescopic image is presented thereupon.

3. The camera of claim 2 that further includes a stop means for regulating the travel of said slide means between a first position wherein the element is in the image plane of the telescope and a second position wherein the bottom surface of the element is coaligned with the top wall of the slit.

4. The camera of claim 2 that further includes an adjustable eyepiece located in the optical path of the telescope and adjusting means for selectively positioning the eyepiece in reference to the image plane of the telescope whereby a clear sharp image may be focused therein.

5. The camera of claim 1 wherein the outside surface of the cylinder provides a close running fit with the inner surface of the focus mount tube.

6. The camera of claim 1 that further includes penetratable light-tight seals positioned at the entrance and exit to said slit.

7. A camera that is capable of being mounted within the focus mount tube of a telescope through which the telescopic image passes including
- a packet for enclosing a film in light-tight relationship therein having a cutout that overlies a hole formed in the film,
- a housing having an exposure aperture passing vertically therethrough and a horizontal slit passing through both the housing and the aperture that is capable of receiving said packet therein and guiding the packet through said housing,
- a hollow mounting cylinder depending downwardly from the bottom wall of the housing, said cylinder being coaxially aligned with the aperture and being arranged to enclose the bottom entrance to the aperture, said cylinder being slidably received within the focus mount tube to permit the telescopic image to be presented upon an image plane lying along the slit, and
- a pin slidably mounted within the housing and being arranged to move into the slit to engage the hole formed in the film and position the film over the aperture whereby the packet can be independently moved along the slit to expose the film to a light image passing through the aperture.

8. The camera of claim 7 that further includes a spring means acting upon said pin to urge the pin into engagement with the hole formed in the film.

9. The camera of claim 7 that further includes a slide means mounted within the aperture that is arranged to move in a vertical direction therein, a flat ground optical element supported in the slide means so that the element can be selectively positioned in the image plane of the telescope whereby the telescopic image is presented thereupon.

10. The camera of claim 9 that further includes a stop means for regulating the travel of said slide means between a first position wherein the element is in the image plane of the telescope and a second position wherein the bottom surface of the element is coaligned with the top wall of the slit.

11. The camera of claim 7 wherein the outside surface of the cylinder provides a close running fit with the inner surface of the focus mount tube.

12. The camera of claim 7 that further includes penetratable light-tight seals positioned at the entrance and exit to said slit.

* * * * *